United States Patent [19]
Grimshaw et al.

[11] Patent Number: 5,989,384
[45] Date of Patent: *Nov. 23, 1999

[54] METHOD OF USING A VARIABLE FORCE COMPACTOR

[75] Inventors: Michael N. Grimshaw, Milford; James R. Hecht, Mason, both of Ohio

[73] Assignee: Unova IP Corp., Beverly Hills, Calif.

[ * ] Notice: This patent is subject to a terminal disclaimer.

[21] Appl. No.: 08/753,861

[22] Filed: Dec. 3, 1996

Related U.S. Application Data

[62] Division of application No. 08/271,320, Jul. 6, 1994, Pat. No. 5,738,749, which is a continuation of application No. 08/068,017, May 27, 1993, abandoned.

[51] Int. Cl.[6] ........................................................ B32B 31/20
[52] U.S. Cl. .............................. 156/312; 156/358; 156/60; 156/523; 156/574
[58] Field of Search ................................ 156/60, 64, 312, 156/358, 523, 574

[56] References Cited

U.S. PATENT DOCUMENTS

| | | | |
|---|---|---|---|
| 4,557,783 | 12/1985 | Grone et al. ............................ | 156/257 |
| 4,750,965 | 6/1988 | Pippel et al. .......................... | 156/574 X |
| 4,869,774 | 9/1989 | Wisbey .................................... | 156/523 |
| 4,915,771 | 4/1990 | O'Brien et al. ........................ | 156/574 |
| 4,954,204 | 9/1990 | Grimshaw ............................... | 156/361 |
| 5,011,563 | 4/1991 | Shinno et al. ....................... | 156/358 X |
| 5,022,952 | 6/1991 | Vaniglia ................................. | 156/441 |
| 5,269,869 | 12/1993 | Peterson ............................. | 156/574 X |
| 5,314,563 | 5/1994 | Grimshaw et al. ................. | 156/574 X |
| 5,316,612 | 5/1994 | Peterson et al. .................... | 156/574 X |
| 5,352,306 | 10/1994 | Grimshaw et al. ................. | 156/523 X |
| 5,454,897 | 10/1995 | Vaniglia . | |
| 5,480,508 | 1/1996 | Manabe et al. ....................... | 156/523 X |
| 5,738,749 | 4/1998 | Grimshaw et al. .................... | 156/312 |

OTHER PUBLICATIONS

Pneutronics VIP–FLEX, Pressure Control Unit, two pages, copyright 1990. LDI Pneutronics Corp., 26 Clinton Drive, Unit 103, Hollis, NH 03049.

*Primary Examiner*—Curtis Mayes
*Attorney, Agent, or Firm*—Thomas M. Farrell; Donald Dunn

[57] ABSTRACT

A head is positionable close to a supported composite material. A compactor on the head is movable relative to the head by a fluid actuator. A programmable valve means ports air into the actuator at several different pressures to provide variable compaction force.

9 Claims, 10 Drawing Sheets

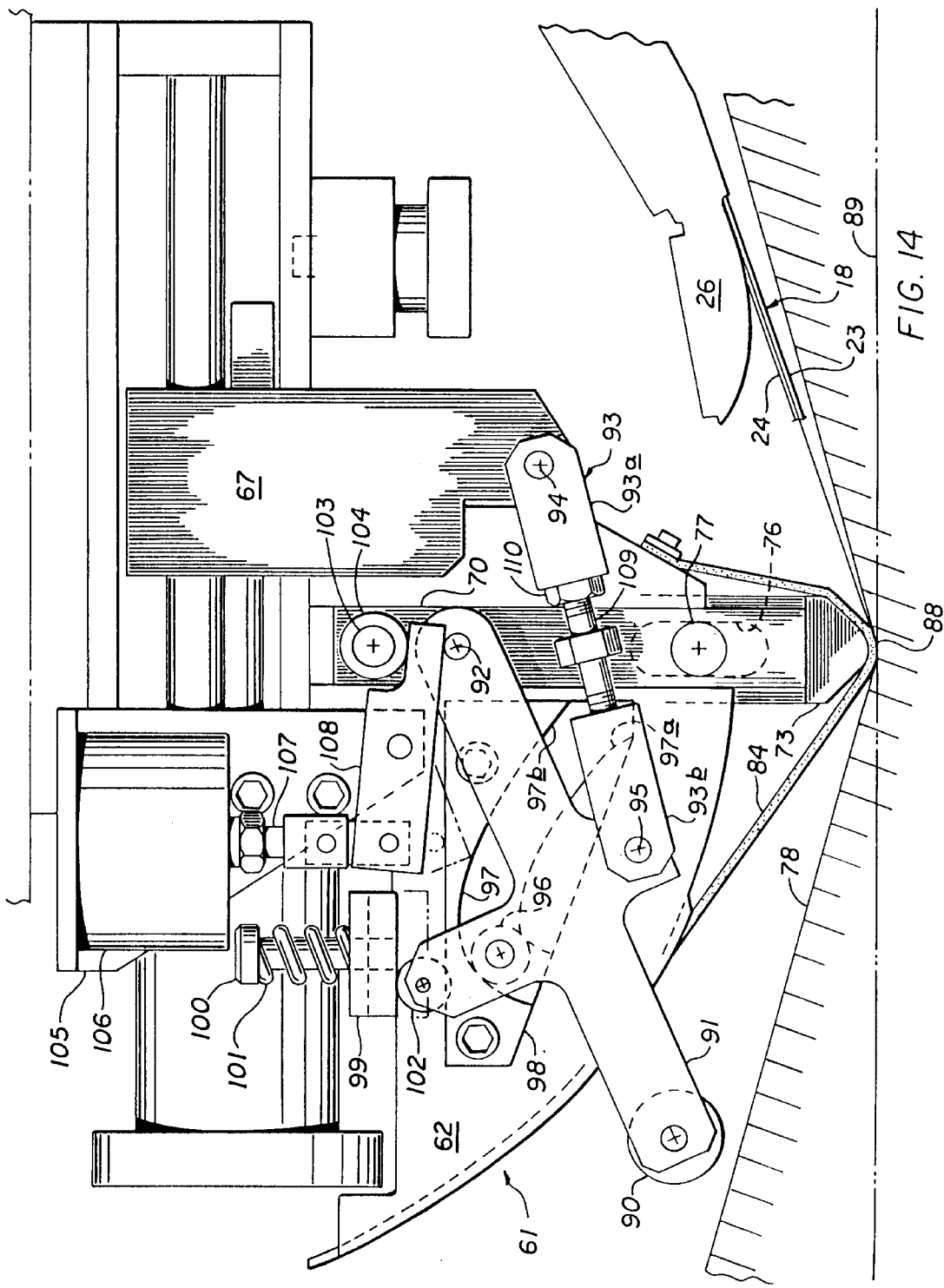

METHOD OF USING A VARIABLE FORCE COMPACTOR

This application is a division of application Ser. No. 08/271320, filed Jul. 6, 1994, now U.S. Pat. No. 5,738,749, which is a continuation of Ser. No. 08/068,017, filed May 27, 1993, abandoned.

FIELD OF THE INVENTION

In general, this invention relates to machines which lay composite material onto a surface, where it is desirable to compact strips having tails, i.e., trailing sections of material which are less than full strip width. In particular, this invention relates to compaction of composite tape by a compactor having at least two levels of compaction force.

BACKGROUND OF THE INVENTION

In the field of advanced composite where a composite tape of fiber reinforced resin is laid on a tool to create laminated structures such as aircraft parts, it is necessary to lay progressive runs of tape at angles other than 90° and 0° with the tool. When laying cross plies, for example at 45°, it is often necessary to cut the end of the tape strip at some angle other than 90° with the tape length, and a problem may arise when a primary compacting member spans adjacent pieces, which are carried on a backing.

PRIOR ART

U.S. Pat. No. 4,557,783, of R. J. Grone et al, issued Dec. 10, 1985, addresses the problem of tail compaction in a composite tape laying machine. The machine and compaction device are shown herein as Prior Art FIGS. 1, 2a, 2b, and 2c. The entire disclosure and teaching of the '783 patent is expressly incorporated herein by reference. Prior art FIG. 1 depicts a high rail gantry tape laying machine 10 wherein a tape laying head 11 is transported coordinately on horizontal side rails 12 and transverse gantry rails 13 under a program commanded by a numerical control (NC) unit 14. A contoured tape laydown surface 15, or tool, is positionable with respect to the tape laying head 11 to form laminated composite structures. The tape laying head 11 comprises, in part, a main frame 16 supporting a tape supply reel 17. The supply reel 17 carries a tape structure 18 comprising a filamentous composite tape and a paper backing. The tape structure 18 is trained under a tape compactor unit 19 and backing is accumulated on a take-up reel 20, in a manner well-known in the art. The tape laying head 11 is movable along a vertical, or Z-axis 21 to adapt to changing tool heights along the tape path, and the entire tape head 11 is rotatable around the vertical axis 21. FIG. 2a depicts a schematic of the tape laying head 11 movable in a direction "X" with respect to a tool 22. The tape laying head 11 has a supply reel 17 which feeds out a tape structure 18 comprising a composite tape 23 releasably attached to a backing 24 such as a paper strip. The tape structure 18 feeds through a cutter unit 25 and tape guide chute 26 to its lowermost position, adjacent the tool 22, where it then passes under a presser shoe or primary compactor 27 of the tape compactor unit 19. As the tape 23 is pressed against the laydown surface 28 of the tool 22, the backing 24 is separated and pulled onto the take-up reel 20 on the head 11. Since the compactor 27 will ultimately see a tape tail 29, as depicted in FIG. 2b, and since the compactor 27 presses against the backing 24 in order to force the tape 23 against the laydown surface 28, it is obvious that the following section 30, complementary to the tail 29, would also be stuck down if there were only one compactor 27. To obviate this difficulty in handling the tail 29, the prior art tape head 11 includes a tail compactor 31, which is a roller 32, carried on a pivotable bell crank 33. The bell crank 33 is swung from a pivot joint 34 on the head 11 by a cylinder 35, reacting against the head 11, to drive the tail compactor 31 against the tape 23 in the manner shown in FIG. 2c. The tail compactor 31 is located at a spot between the backing 24 and the previously laid tape 23a, so that it contacts only tape 23 when swung into the "down" position. Through linkage 36 attached from the bell crank 33 to the primary compactor 27 and to a backing guide 37, the downward stroke of the tail compactor 31 with respect to the tape laying head 11 forces the primary compactor 27 and entire tape head 11 up, away from the laydown surface 28, and the linkage 36 also moves the backing guide 37 into a position to help steer the backing 24 on its way to the take-up reel 20.

Certain features are noteworthy: Since the primary compactor is affixed to the tape head, the primary compaction force is provided by the head itself. And, since the tail compactor is thrust into position by reaction against the tape laying head, the tail compaction force is likewise provided by the head itself. Additionally, the primary and tail compactors, as depicted, are spaced from one another along a horizontal plane, and this may prohibit application of the head to certain contoured parts which deviate substantially from a flat surface, along the tape length.

U.S. Pat. No. 4,954,204, of M. N. Grimshaw, issued Sep. 4, 1990, teaches a presser member for contoured surfaces, and the entire disclosure and teaching of the '204 patent is expressly incorporated herein by reference. The '204 device is depicted herein as Prior Art FIGS. 3, 4, 5a, 5b, and 5c. With reference to Prior Art FIG. 3, the '204 patent teaches a presser member 38 which is affixed to the bottom of a tape laying head 11, as a primary compactor, but wherein the primary compaction force is obtained from an actuator 39 (See FIG. 4) within the device itself; thus the presser member elements move with respect to the tape head 11. The presser member elements comprise a shoe plate stack 40, i.e., plurality of adjacent shoe plates 41 of common cross-section (see FIG. 4), which may adapt to contours occurring across the tape strip 23. The presser member 38 is a four-bar linkage of the double-slider type, where a horizontal slider 42 is connected by a control link 43 to a vertical slider (the shoe plate stack 40). The presser member 38 has a housing 44, quarter-rounded at its lower rear surface and hollowed out to accommodate detail pieces. The top of the housing supports a centrally located air cylinder 45, having a piston rod 46 extending frontwardly, i.e., to the right of the figure. Immediately adjacent the front of the cylinder 45 is a pair of parallel guide rods 47a,b, one at each side of the assembly. The horizontal slider 42 rides on the guide rods 47a,b, and the end of the piston rod 46 is affixed to the slider 42.

FIG. 4 shows the shoe plates 41 in relation to the control link 43 and a control rod 48 which extends through the shoe plates 41. At the interior of the housing 44 is the actuator 39 for biasing the plates 41 downwardly, away from the housing 44. The actuator 39 is a closed bladder spring, where a chamber 49 is faced with a flexible membrane 50 which contacts the top edges of the shoe plates 41. Pressurized fluid is ducted into the chamber through a port 51 to load the compliant membrane 50 against the shoe plates 41.

FIG. 5a is a diagrammatic view of the elements of FIG. 3, showing the quarter-round housing 44 supporting the vertically movable shoe plate stack 40, with a latch finger 52 "up" and the slider 42 moved to the right against the latch finger 52. The control link 43 is shown connected to the control rod 48 which evens out, or "nulls" all plates at a known dimension, Z'. The downward biasing force provided by the membrane 50 is depicted as a bladder spring 53 reacting against the top edge of the shoe plates 41. The position of the elements in FIG. 5a is used for programming all vertical, or Z-axis dimensions, providing a known point from which the shoe plates 41 may float up and down. FIG. 5b depicts elements of FIG. 5a in an alternate position, where the latch finger 52 is "down" and the slider 42 is moved leftwardly to the fully-retracted position. This position of the presser member 38 is used for compacting a tape strip 23 against the tool laydown surface 28. The control link 43 has moved the horizontal control rod 48 to an intermediate position within the shoe plate slot 54; the shoe plates 41 are free to float on tool contours as the bladder spring 53 biases the entire shoe plate stack 40 against the tape 23. FIG. 5c depicts the latch finger 52 retracted, and the slider 42 now fired to the fully-advanced position, all the way to the right. The control link 43 now pulls the control rod 48 to a new raised position, thus fully-retracting the vertically-movable shoe plates 41 upwardly into the housing 44, compressing the biasing bladder spring 53. This position permits the use of auxiliary equipment, such as a tail compacting roller 55.

SUMMARY OF THE INVENTION

It is an object of the present invention to provide a compactor assembly for composite material, and method of use, wherein a primary compactor is independently powered with respect to a machine head and combined with a secondary compactor which is likewise independently powered with respect to the head, and where at least one of the compactors may be operated with at least two different levels of compaction force.

Another object of the present invention is to provide a composite tape strip compactor assembly, and method of use, in which a main compactor is adaptable to contour changes occurring across the tape strip and a tail compactor is capable of tail compaction on surfaces deviating substantially from a flat plane along the tape length, and where at least one of the compactors may be operated with at least two different levels of compaction force.

Another object of the present invention is to provide a compactor assembly for composite tape, and method of use, in which a main compactor is utilized for laying essentially a full-width tape strip at a tape laydown point defined with respect to a tape laying head, and in which the main compactor is displaced by a tail compactor which may finish laying the tail of the tape strip at the tape laydown point, and where at least one of the compactors may be operated with at least two different levels of compaction force.

Still another object of the present invention is to provide a compactor assembly for composite tape, and method of use, wherein main compaction and tail compaction occur at substantially the same point with respect to the tape laying head which carries the compactor assembly, and where at least one of the compactors may be operated with at least two different levels of compaction force.

A still further object of the present invention is to provide a compactor assembly for composite tape, and method of use, wherein primary tape strip compaction and tail compaction are independent of tape laying head movement and are provided by the same actuator, carried by the tape laying head, and where at least one of the compactors may be operated with at least two different levels of compaction force.

Another object of the present invention is to provide a compactor assembly for composite tape, and method of use, in which linkage is utilized for simultaneously switching positions of the main compactor and tail compactor with respect to a tape laydown point, and where at least one of the compactors may be operated with at least two different levels of compaction force.

The foregoing objects are achieved by the invention which is embodied in a method for compacting composite materials, comprising the following steps: placing composite material on a support surface; positioning a compaction frame proximal said support surface; providing a compaction element on said frame between said frame and said material; providing a fluid actuator between said element and said frame; porting pressurized fluid into said actuator; applying a first compaction force to said material with said compaction element; varying the pressure of said pressurized fluid; and applying a second compaction force to said material with said compaction element.

BRIEF DESCRIPTION OF THE DRAWINGS

FIG. 14 is a side elevational view of a tape compactor assembly.

DESCRIPTION OF THE PREFERRED EMBODIMENT

It should be noted that certain attitudinal references are employed herein, e.g., "horizontal", "vertical", and the like.

Such references are only for the convenience of the reader, and the machine structure is not so limited; those skilled in the art will appreciate that the spatial ordinates of the machine may be changed to suit a variety of tasks within the scope of the invention.

Figure 1:
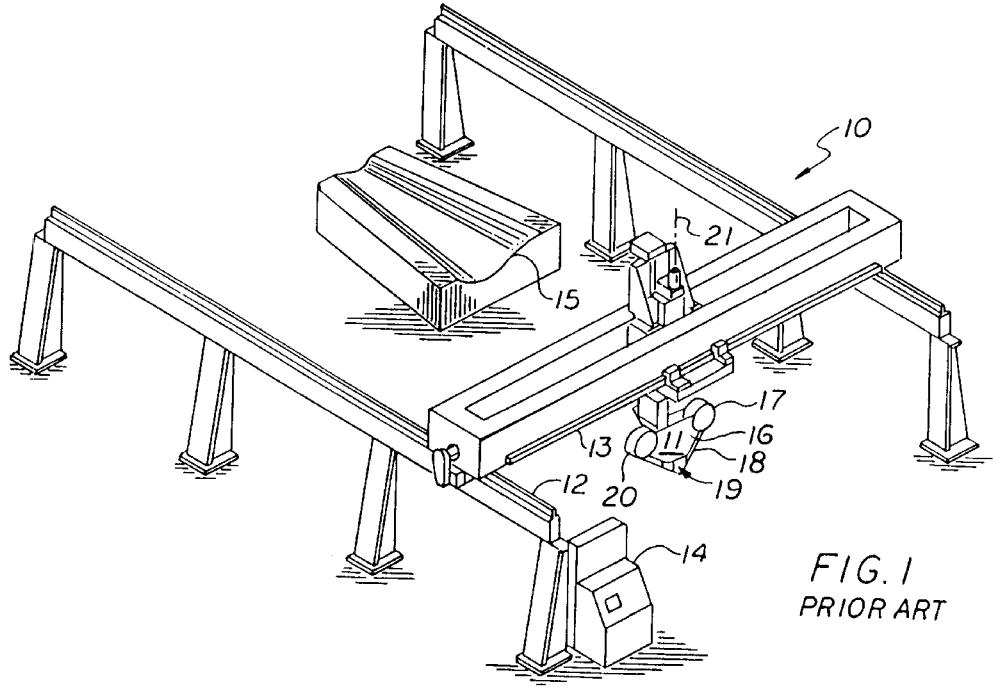
FIG. 1 is a perspective view of a prior art tape laying machine.
Figure 6:
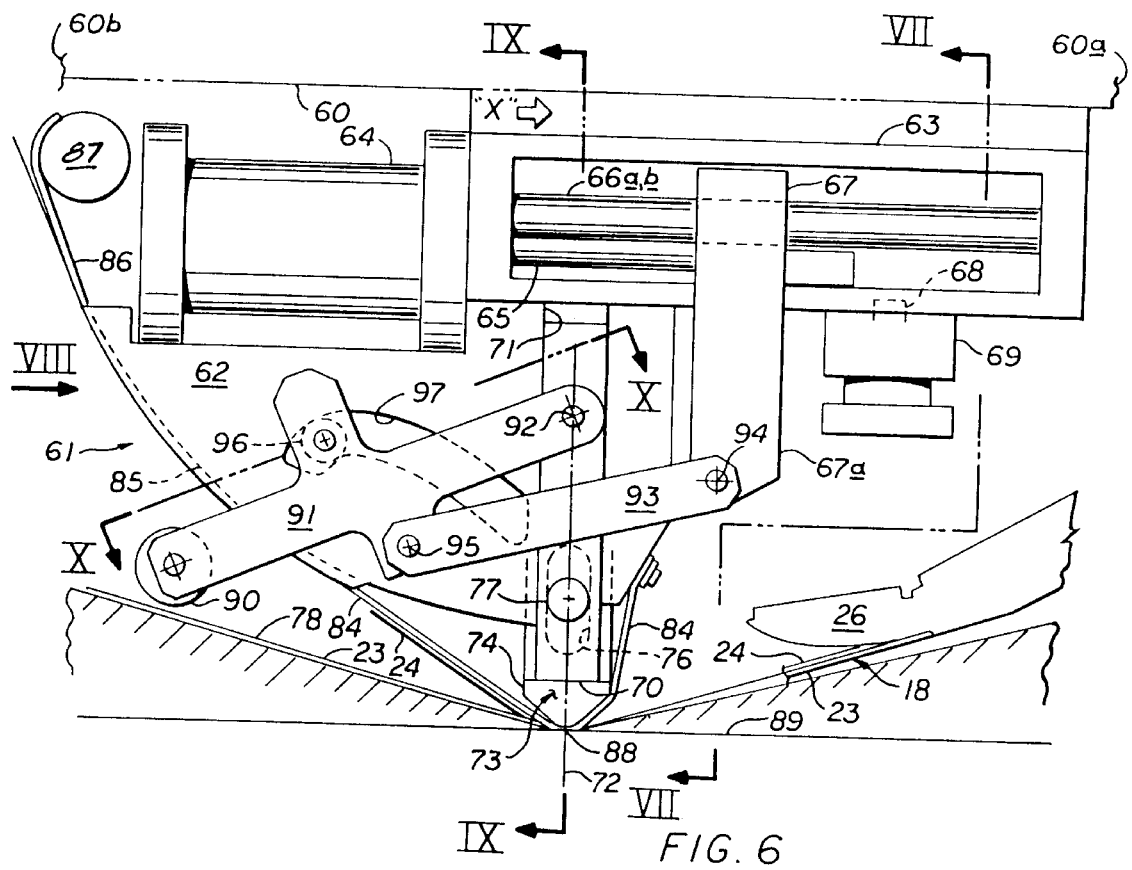
FIG. 6 is a side elevation of a tape compactor assembly.
Figure 7:
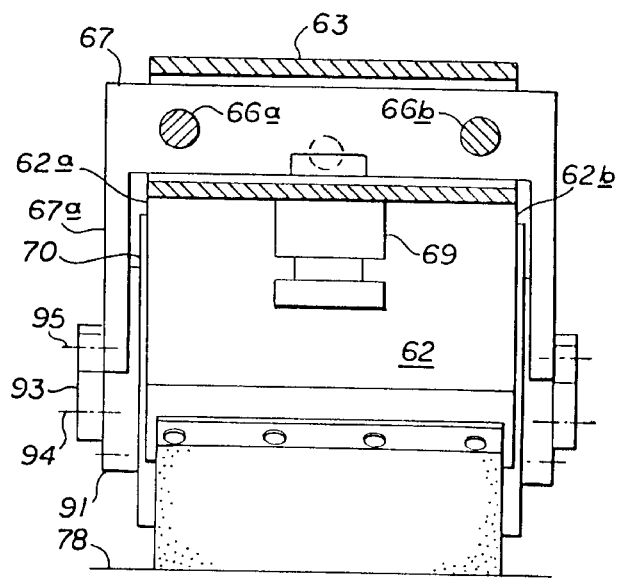
FIG. 7 is a front elevational section, taken along the line VII—VII of FIG. 6.

With reference to FIG. 6, a tape head 60 is shown with an improved tape compactor assembly 61 affixed to its bottom surface. The tape head 60 is of a type which may be used with the tape laying machine 10 of FIG. 1. The tape compactor assembly 61 will move in a forward direction "X" with the tape head 60, to the right of the FIG., when laying tape 23, and the head 60 thus has a front end 60a, at the right of the FIG., and a rear end 60b to the left of the FIG. The assembly 61 includes a housing 62 which is quarter-rounded at its lower rear surface and hollowed out to accommodate detail pieces (not shown). The top surface of the housing 62 has a frame 63 affixed thereto, which extends frontwardly. The frame 63 serves as a mounting for an air cylinder 64, which has a piston rod 65 extending frontwardly. The frame 63 also supports a pair of parallel guide rods 66a,b, one at each side of the assembly 61, and a horizontal slider 67 rides on the guide rods 66a,b and extends across the housing 62 from side-to-side (see also FIGS. 7 and 8). The slider 67 is affixed to the piston rod 65.

Figure 11A:
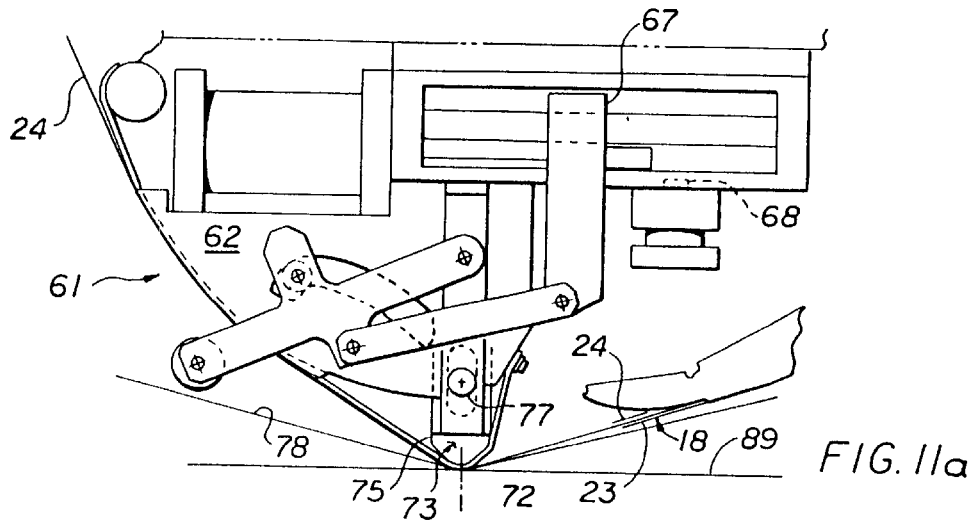
FIGS. 11a, 11b, and 11c are diagrammatic views of the tape compactor assembly of FIG. 6.
Figure 11B:
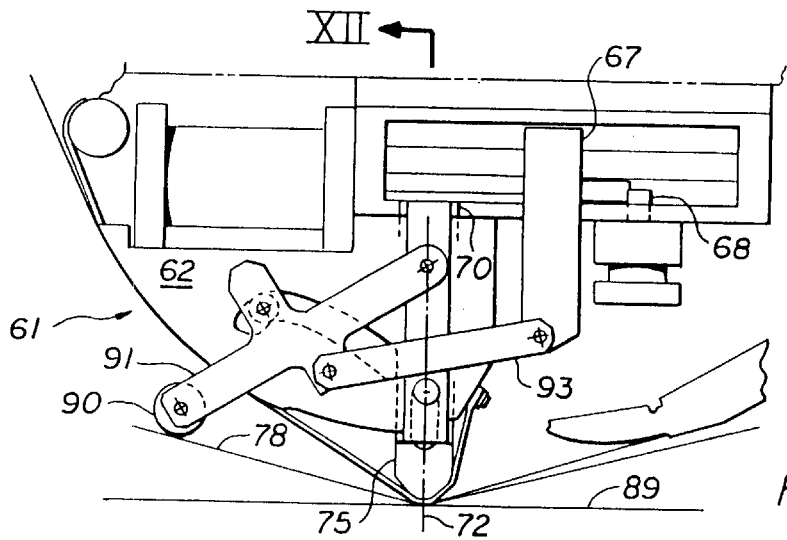
Figure 11C:
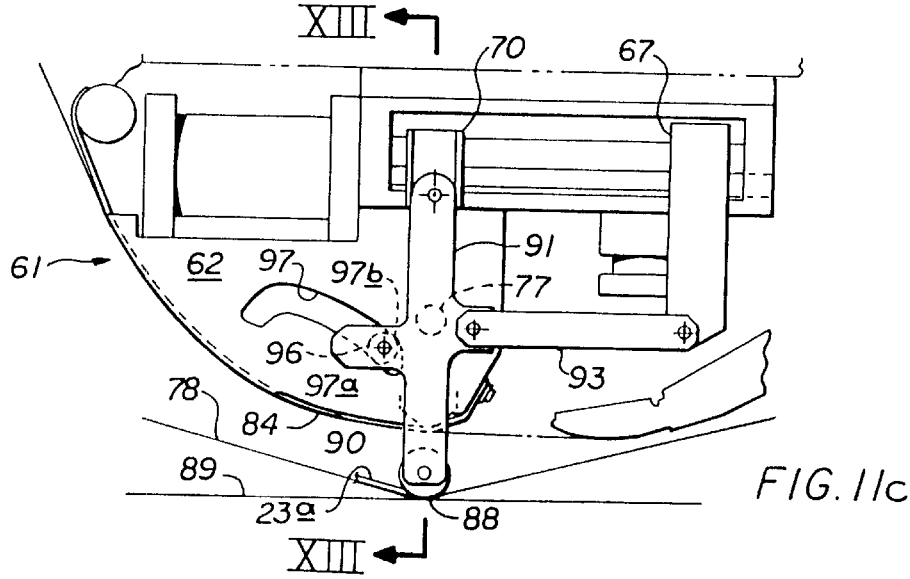

The horizontal slider 67 has three specific positions:

(1) fully-retracted, as in FIGS. 6 and 11a;

(2) forwardly-advanced against a latch finger 68, as in FIG. 11b; and (3) fully-advanced to the right with the latch finger 68 retracted, as in FIG. 11c.

Figure 9:
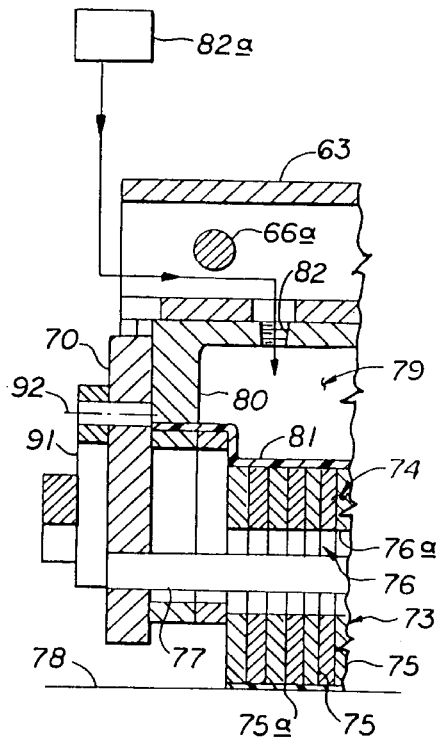
FIG. 9 is an elevational section, taken along the line IX—IX of FIG. 6.
Figure 13:
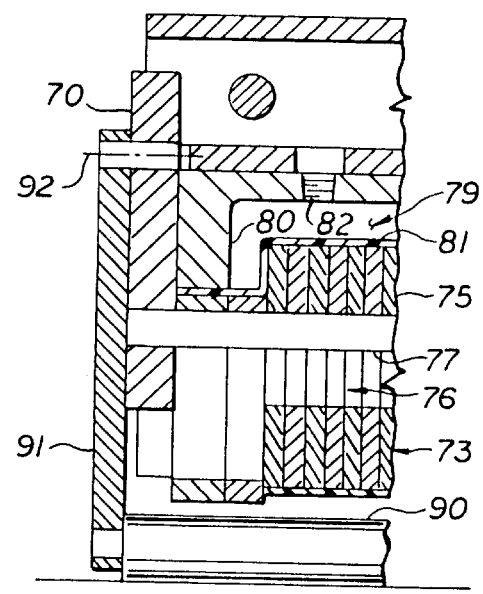
FIG. 13 is an elevational section, taken along the line XIII—XIII of FIG. 11c.

The latch finger 68 is powered in vertical directions by a compact fluid cylinder unit 69 secured to the bottom of the frame 63. Each side of the housing 62a,b has a vertical slider 70, constrained to move within a vertical track 71 along a vertical centerline 72 defined on the housing 62. Within the housing 62, immediately behind the vertical slider 70, is a main compactor 73. As shown in FIG. 9, the main compactor 73 comprises a shoe plate stack 74 for contacting the backing 24 of a tape structure 18. The shoe plate stack 74 is a plurality of parallel, wafer-like shoe plates 75 guided for vertical movement with respect to one another within the housing 62 and with respect to the housing 62. A vertical elongate slot 76 of common size is provided in line through all of the plates 75, and a control rod 77 extends horizontally, from side to side through all of the slots 76 and is affixed to the vertical sliders 70. In the position shown in FIGS. 6, 9, and 11a, the control rod 77 is positioned approximately mid-way along the vertical slot 76 so it will not interfere with compactor movement which may require the shoe plates 75 to adapt to a variety of contours across the tape width. This is the normal tape laying position. When it is desired to land the compactor 73 and tape 23 on a work surface 78, at the beginning of a tape laying run, the horizontal slider 67 is stopped against the latch finger 68 as depicted in FIG. 11b. In this position, the upper edges 76a of the slots 76 will rest on the raised control rod 77, causing the bottom edges 75a of the shoe plates 75 to be in line as shown in FIG. 13. This position is an alignment, or "null" position, setting the bottom edges 75a of the plates 75 at a known relationship to the machine coordinates, for programming purposes.

In order to provide a downward biasing force to all of the plates 75, a bladder spring 79 has been devised, in the manner of U.S. Pat. No. 4,954,204, wherein the housing 62 has a closed chamber 80 formed immediately above the shoe plate stack 74. The chamber 80 includes a -flexible membrane 81 extending across the shoe plates 75, in contact with and spanning the top edges 75b. The chamber 80 is provided with an orifice 82 so that air or other fluid medium may be introduced into the chamber 80 and, thus, pressurize the membrane 81 to provide a downward biasing force to the entire stack of plates 75. The membrane 81 is yieldable, to accommodate surface contour variances which will cause the plates 75 to shift vertically, relative to one another, as the tape 23 is laid.

In the preferred embodiment, the air valve unit 82a (FIGS. 15 and 16) employed to pressurize the bladder spring 79 produces a pressure output which varies in proportion to the magnitude of an electrical signal. Such a valve unit is the Pneutronics VIP-FLEX Pressure Control unit, available from LDI Pneutronics Corp., Hollis, N.H. 03049. Therefore, this valve unit 82a may be controlled in accordance with an NC program to vary air pressure and consequent force directed against the tape 23. As an example, compaction of full-width tape may be performed at a constant pressure. Next, unit loading on a tapered tail may be kept constant by changing the total downward force acting on the tail compaction roller; i.e., by varying air pressure in accordance with the tail profile.

It will be appreciated that in some instances, it may be desirable to supply only a fixed pressure to the bladder spring 79. It may also be desirable to supply two alternative pressures to the bladder spring 79; a first pressure for main compaction, and a second pressure for tail compaction.

With reference back to FIG. 6, a flexible sheet or skid 84 is attached to the front of the housing 62, and directed around the nose, or bottom edge 75a of the shoe plates 75 to present a smooth surface against the backing 24. It may be appreciated, however, that some embodiments may omit the skid 84. The skid 84 is guided around the quarter-round section, within a surface channel or relief 85, and is held taut by a strap 86. The strap 86 is affixed to the skid 84 and tensioned by a coiling device 87 carried on the tape laying head 60. The tape structure 18 is shown coming from the tape guide chute 26 to the tape lay-down point 88 established by the intersection of the vertical centerline 72 and a horizontal plane 89 defined on the work surface 78. At the tape laydown point 88, while the head 60 continues moving to the right, tape 23 is deposited on the work surface 78, and the backing 24 is separated from the tape 23 and pulled upwardly against the skid 84, while running to a take-up reel (not shown).

Figure 2A:
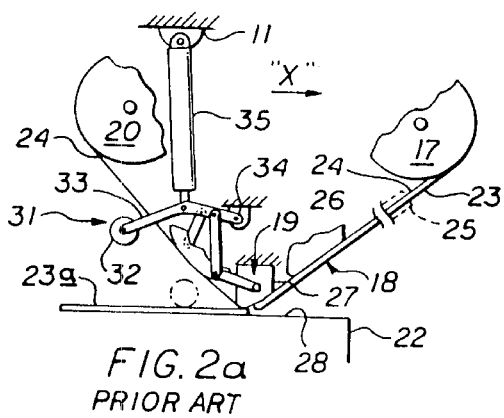
FIG. 2a is a side elevational view of a prior art compactor assembly performing a main compaction operation.
Figure 2C:
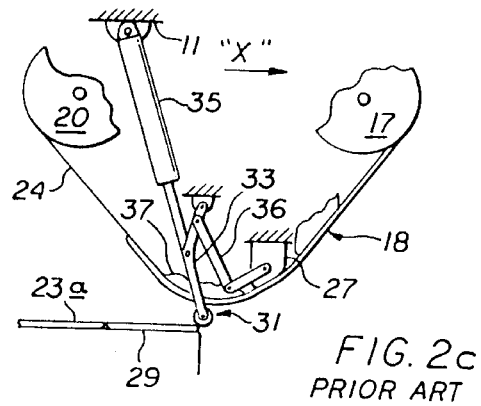
FIG. 2c is a side elevational view of the prior art compactor assembly of FIG. 2a, performing a tail compaction operation.
Figure 2B:
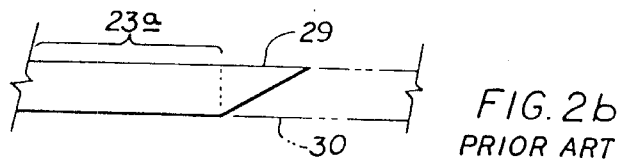
FIG. 2b is a plan view of a prior art tape strip having an angled tail.
Figure 3:
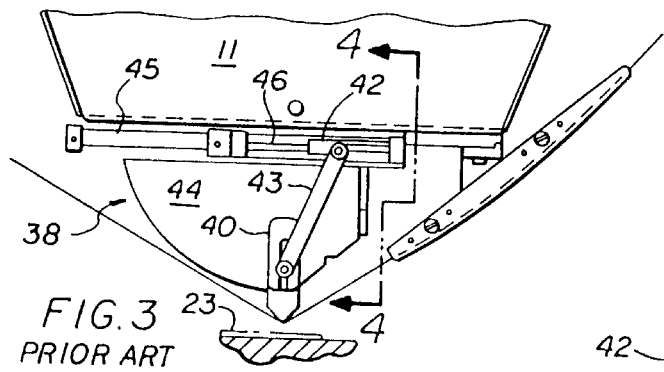
FIG. 3 is a side elevational view of a prior art compactor.
Figure 4:
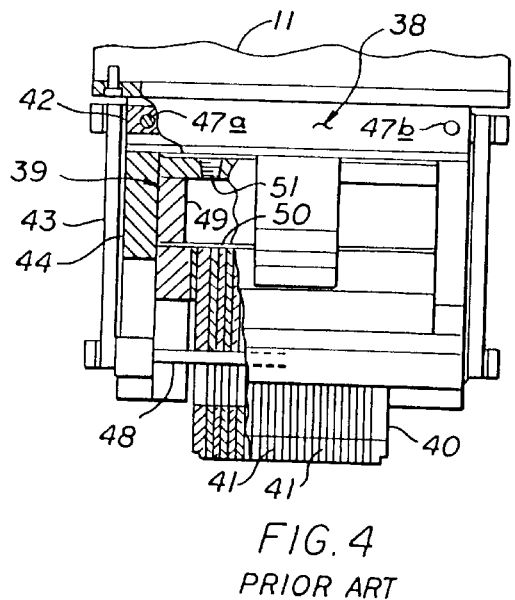
FIG. 4 is a front elevational view, in partial section, taken along the line IV—IV of FIG. 3.
Figure 5A:
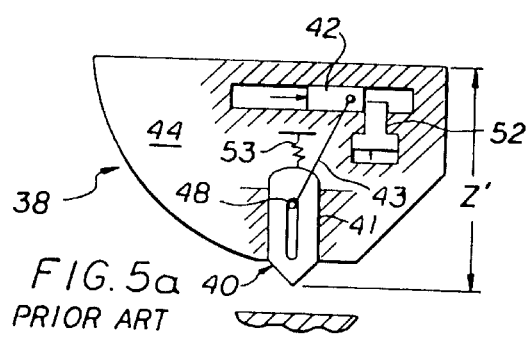
FIGS. 5a, 5b, and 5c are diagrammatic views of the prior art compactor of FIG. 3.
Figure 5B:
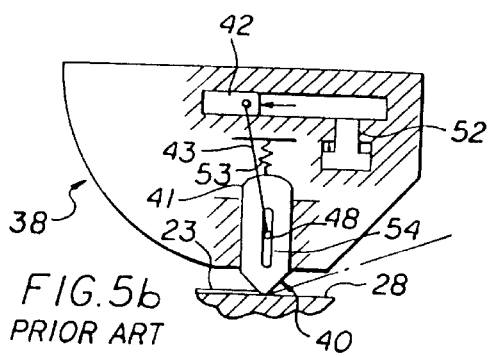
Figure 5C:
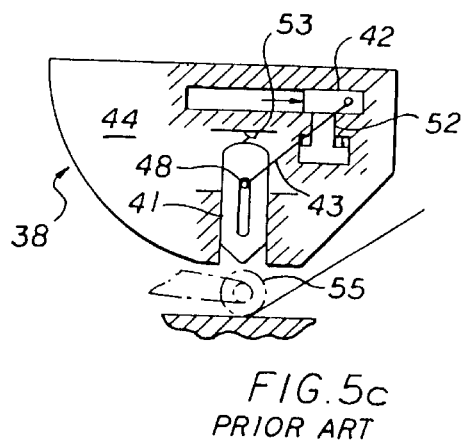

The roller 90 depicted in FIG. 6 is a tail compactor, and is located between the tape 23 and the backing 24, trailing the tape laydown point 88, in the manner taught in U.S. Pat. No. 4,557,783, Prior Art FIG. 2a. The roller 90 is shown in its home position, swung all the way to the left.

Figure 10:
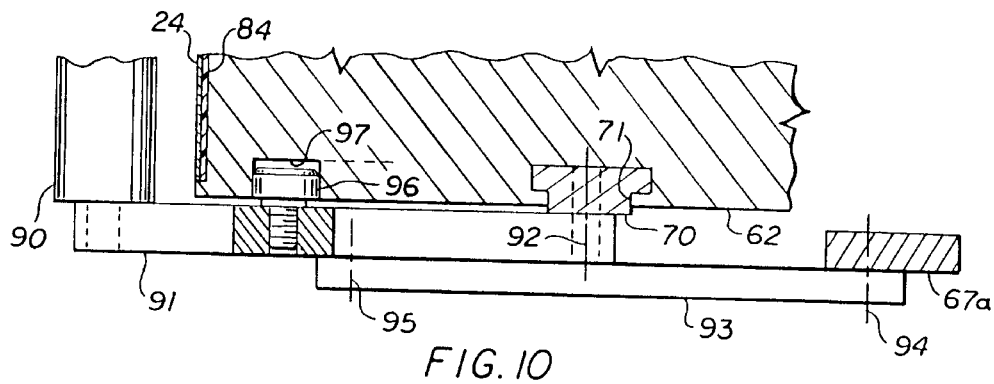
FIG. 10 is a sectional view, taken along the line X—X of FIG. 6.
Figure 8:
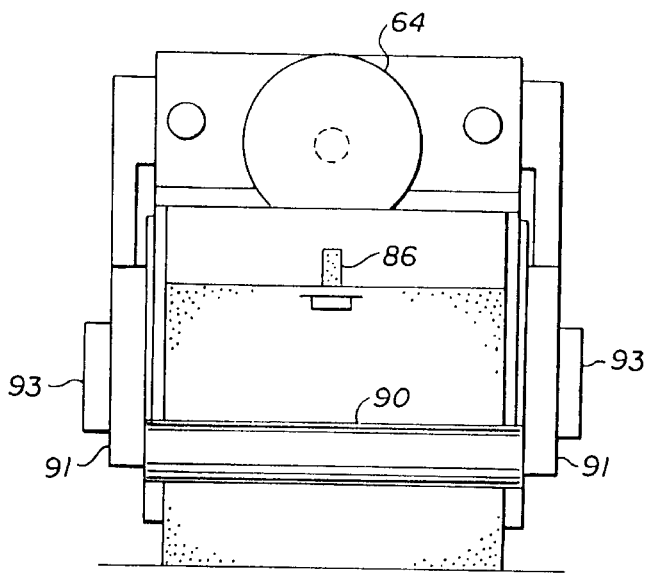
FIG. 8 is a rear view, taken in the direction of arrow VIII of FIG. 6.

A tail compactor is a secondary compactor used for compacting tape of less than full width. The roller 90 is carried at one end of a first elongate link 91, which is pivotally connected at its other end to the vertical slider 70 about a first horizontal pivot axis 92. The horizontal slider 67 has a depending section 67a at each side of the housing 62 (see FIG. 7) which extends approximately midway down the housing 62, and a second elongate link 93 is pivotally connected at one end to the horizontal slider 67 about a second horizontal pivot axis 94 while its other link end is pivotally connected to the first link 91 about a third horizontal pivot axis 95 lying approximately midway between the ends of the first link 91. The first link 91 also includes a cam follower 96 which extends horizontally from the link 91 into a cam slot 97 provided on the housing 62 (see also FIG. 10). The cam slot 97 governs the first link 91 and, consequently, movement of the tail compaction roller 90 as the horizontal slider 67 is driven by the 5 cylinder 64. The cam slot 97 is arcuate and upwardly arched, from its initial portion, thereafter sloping downwardly towards the vertical slider 70. And, while the cam follower 96 is accurately guided within the cam slot 97 for most of the path, the end of the slot 97 is relieved, as will be described later in connection with FIG. 11c. While the first and second links 91,93 under discussion are shown on one side 62a of the housing 62, i.e., facing the viewer, it will be appreciated that there are identical links 91,93 on the opposite side 62b of the assembly 61, and the tail compaction roller 90 spans the first links 91, as shown in FIG. 8.

Compactor Operation

Operation of the compactor assembly 61 may be appreciated by referring to diagrammatic FIGS. 11a–11c.

FIG. 11a depicts the elements of FIG. 6, where the latch finger 68 is "down" and the slider 67 is moved leftwardly to the fully-retracted position. In this position, the main compactor 73 or shoe plate stack 74 is biased against a tape backing 24 which is being stripped from tape 23 laid to the laydown surface 78, and the position of the vertical slider 70 and its control rod 77 is such that the rod 77 will not hinder vertical float of the plates 75 (see also FIG. 9). The bladder spring 79 biases the entire shoe plate stack 74 against the backing 24 and tape 23, and the shoe plates 75 can float in compliance with contour variances occurring across the tape width.

Figure 12:
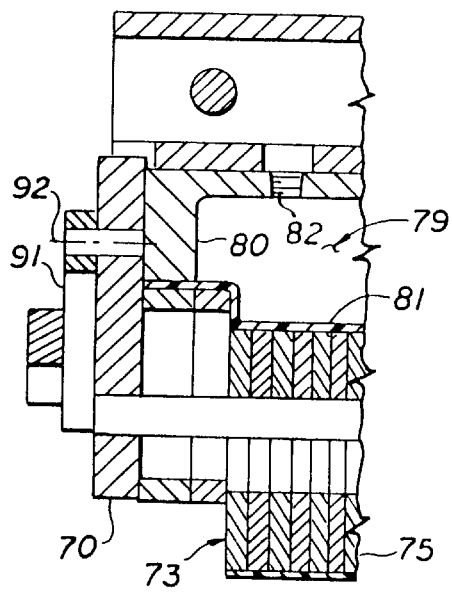
FIG. 12 is an elevational section, taken along the line XII—XII of FIG. 11b.

FIG. 11b depicts the housing 62 with the latch finger 68 "up" and the horizontal slider 67 moved to the right, against the latch finger 68. In this position, the vertical slider 70 is driven upward slightly so that its control rod 77 evens out, or "nulls" all plates 75 at a known dimension, Z' (see also FIG. 12). The position of the elements in FIG. 11b is utilized for programming all vertical, or Z-axis dimensions.

FIG. 11c depicts the latch finger 68 "down", and the horizontal slider 67 now fired to the fully-advanced position, all the way to the right. The vertical slider 70 is now driven to a new raised position where its control rod 77 drives the vertically-movable shoe plate stack 74 to a fully-retracted upward position into the housing 62, compressing the bladder spring 79 (see also FIG. 13). The skid 84 will follow along with the stack 74. Simultaneous with this movement of the vertical slider 70, in response to horizontal slider link 91 is first elongate link 91 is swung to a nearly vertical position, governed through most of its movement by the cam follower 96 traveling in the cam slot 97, so that the tail compaction roller 90 will be switched into the region of the tape laydown point 88, previously occupied by the now-retracted main compactor 73 (shoe plate stack 74). The linkage, coupled with guidance provided by the cam follower 96, insures that the tail compaction roller 90 will move along a path which will not interfere with the substantial slope (approximately 15°) of the work surface 78 with respect to the horizontal plane 89. With reference to FIG. 13, the tail compaction force is accomplished by the same bladder spring 79 which provides the main compactor force. The compressed bladder spring 79 attempts to drive the control rod downward along with the vertical slide 70, and the vertical slide 70 in turn, drives the first elongate link 91 and roller 90 downward against the tape tail 23a. The sides 97a,b of the cam slot 97 are slightly flared for clearance (see also FIG. 14) when the cam follower 96 is positioned as in FIG. 11c, so the first link 91 and roller 90 may move vertically relative to housing 62 against the tail 23a.

Thereafter, as the tape head 60 is lifted from the work surface 78 in anticipation of another tape laying run, the horizontal slider 67 is retracted to the left, causing the tail compaction roller 90 to swing back out to its home position, and permitting the main compactor 73 (shoe plate stack 74) to descend.

FIGS. 6–9 depict an ideal situation for the invention, where it is assumed that the vertical slide 70 will move upward easily when the horizontal slide 67 is actuated. It is further assumed that the cam follower 96 moves without shake in the cam slot 97. In actual practice, though, frictional forces are present, and the cam slot 97 at each side 62a,b, of the housing 62 is manufactured with clearance; therefore, to ensure quick action and smoothness, a practical embodiment of the invention is further developed in FIG. 14, where the following features may be seen:

1. The cam slot 97 is formed into a cam plate 98 bolted to the sides 62a,b, of the housing 62; this simplifies machining and heat treatment, as well as alignment of the right and left side elements.

2. A spring-loaded plate 99, slidable on shoulder screws 100, spans the housing 62 and is biased downwardly by springs 101 guided on the shoulder screws 100. The plate 99 contacts a roller 102 which is clevis-mounted within the first link 91, just above the cam follower 96. The spring-loaded plate 99 keeps shake out of the assembly 61 while the tail compaction roller 90 is in its home position, and provides impetus for the first portion of its advancement to the tape laydown point 88.

3. The top portion of the vertical slider 70 is provided with a horizontal stud 103 which carries an antifriction roller 104. A bracket 105 on the sides 62a,b of the housing 62 supports a helper cylinder 106. The cylinder 106 has a short-stroke piston rod 107 linked to a lever 108 pivotally-mounted to the bracket 105. The lever 108 extends under the roller 104 and serves to provide an initial lifting force for the vertical slider 70, to overcome friction as the horizontal slider 67 is actuated. Once moving, the mechanical advantage of the horizontal slider 67 over the vertical slider 70 increases, and the assist provided by the lever 108 is no longer needed. The piston rod 107, lever 108 and roller 104 are all outside of the first link 91, to avoid interference.

4. The second link 93 is comprised of two link ends 93a,b, connected by a stud 109, threadably received therein, and a locknut 110 secures the assembly once the proper dimension between the second and third pivot axes 94,95 has been established.

Those skilled in the art will appreciate that the vertical slider 70 may be provided with antifriction elements in certain applications. Similarly, provision of antifriction elements within the various sliders, pivot joints and rollers herein, are deemed to be well within the ken of the machine designer.

It may be noted that, while the actuator for the main compactor 73 comprises a bladder spring 79, having a closed chamber with a membrane covering, it is also anticipated that the membrane 81 may be omitted, and fluid pressure may be applied directly against the top of the shoe plate stack 74 to bias the stack 74 in a downward direction.

It is further contemplated that a resiliently faced element may be substituted for the main compactor 73, and other devices may be substituted for the tail compaction roller 90.

Figure 16:
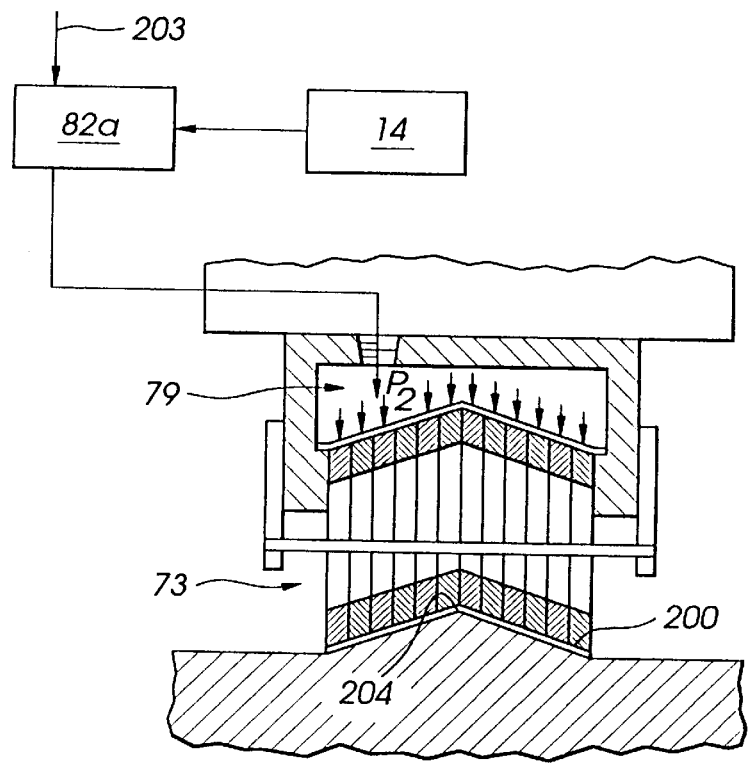
FIG. 16 is an elevational section through a tape compactor, illustrating a work surface having a peak.
Figure 15:
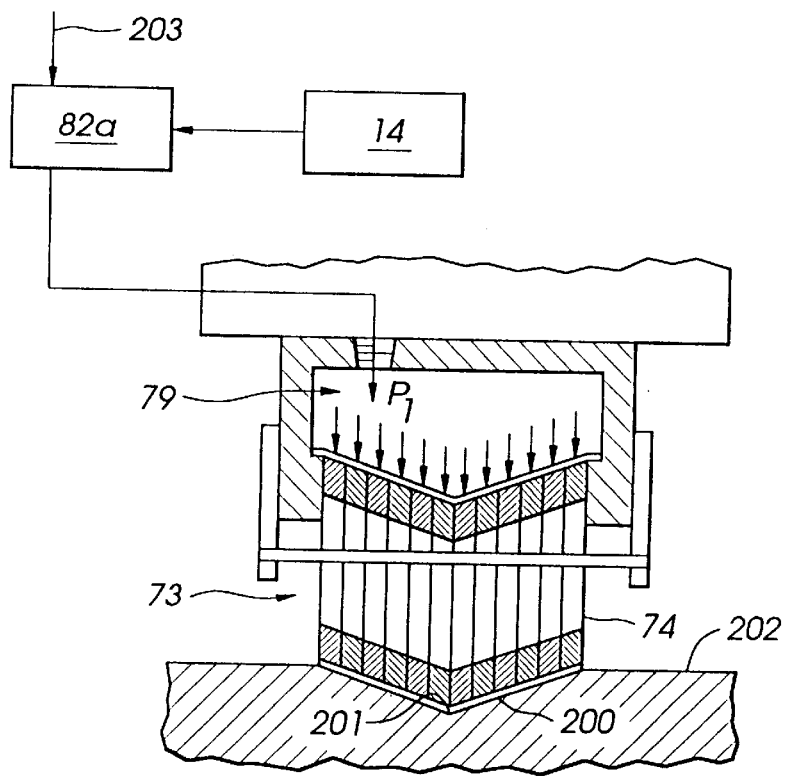
FIG. 15 is an elevational section through a tape compactor, illustrating a work surface having a valley.

The sectional view depicted in FIG. 15 shows certain elements of FIG. 9, wherein the main compactor 73, or shoe plate stack 74 is shown distributed across a tape strip 200 laid in a valley 201 of a work surface 202. In general, more compaction force is needed to compact the tape strip 200 into the valley 201, than is needed to compact the tape strip 200 on a flat surface. In this case, therefore, the valve unit 82a is modified by command from the NC unit 14 to port a higher pressure $P_1$ into the bladder spring 79 than is required for normal flat laying runs. As stated before, the air valve unit 82a receives a supply of air or other fluid from a supply line 203, and is easily modulated or changed in response to an NC program, since the machine programmer will be well aware of the tool contours and tape strip placement requirements. As further illustration of the desirability of having a programmable air pressure and consequent programmable compaction force capability, FIG. 16 depicts the elements of FIG. 15 when changing to a profile which has a peak 204 occurring across the tape width. Here, a lesser compaction force is needed than is required to lay the tape strip 200 into a valley 201 per FIG. 15, and consequently, the valve unit 82a is managed by further instruction from the NC unit 14 to reduce the pressure from that of FIG. 15 to a reduced pressure, $P_2$.

The use of a main compactor 73 as in FIGS. 15 and 16, is not confined to a tape laying machine (see FIG. 1); but is adaptable to other machines which apply composite material to a support surface; for example, a fiber placement machine as depicted in U.S. Pat. No. 5,022,952, of M. Vaniglia, issued Jun. 11, 1991. The entire disclosure and teaching of the '952 patent is herein expressly incorporated by reference.

Figure 17:
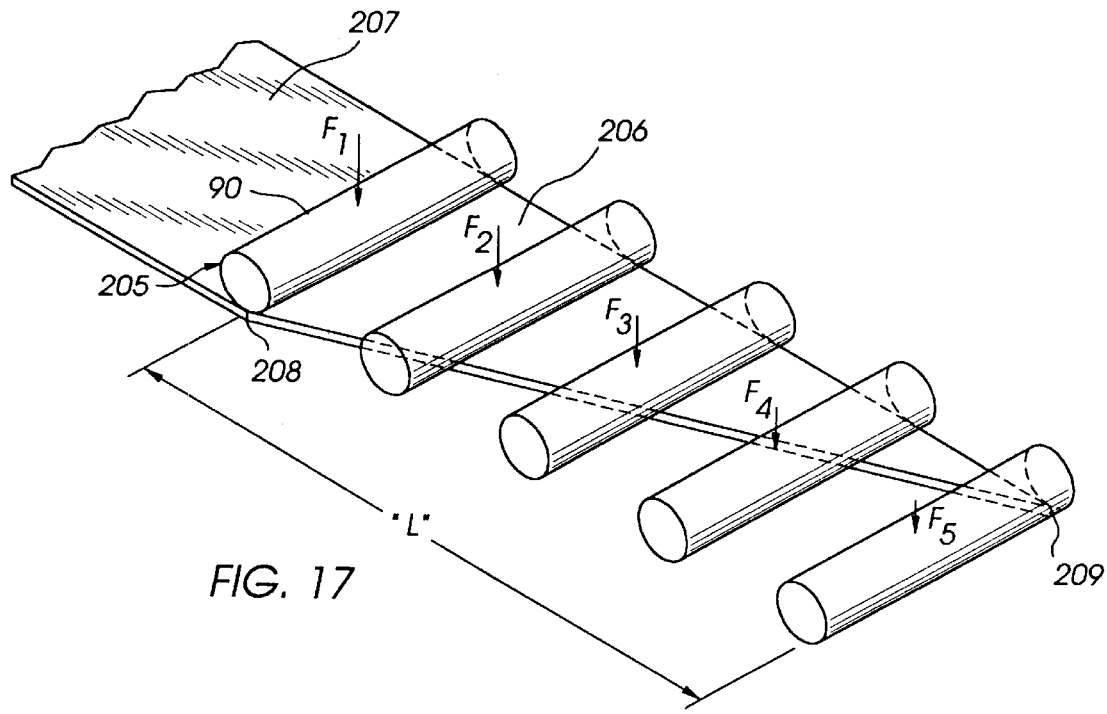
FIG. 17 is a diagrammatic view, in perspective, showing a compaction roller on a tape tail.
Figure 18:
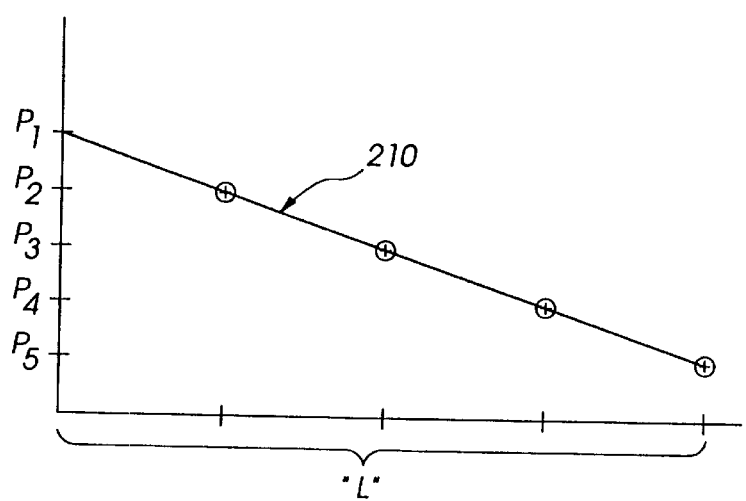
FIG. 18 is a graph plotting compactor air pressure vs. tape tail length.

FIG. 17 discloses a sequence drawing, in perspective, of application of a variable force tail compactor 205 to a linearly tapering tail 206 of a composite tape strip 207. In this case, for illustration purposes, five positions are shown along the tape tail 206 where it is desired to maintain a constant unit loading on the tail material with a tail compaction roller 90 which extends for the full width of the tape 207. In this case, therefore, the force applied to the roller 90 should decrease linearly from the beginning 208 of the tape tail 206 to the end 209. The five positions depicted illustrate force levels $F_1$, $F_2$, $F_3$, $F_4$ and $F_5$, which correspond to pressure levels $P_1$, $P_2$, $P_3$, $P_4$ and $P_5$. A pressure distribution graph 210 is shown in FIG. 18, where the pressure varies linearly for the length of the tail, "L". Thus, the valve unit 82a is programmed for variable pressure along the tail 206. With reference back to FIGS. 9 and 13, the tail compaction force is provided to the roller 90 by the bladder spring 79, pressurized by the valve unit 82a.

Figure 19:
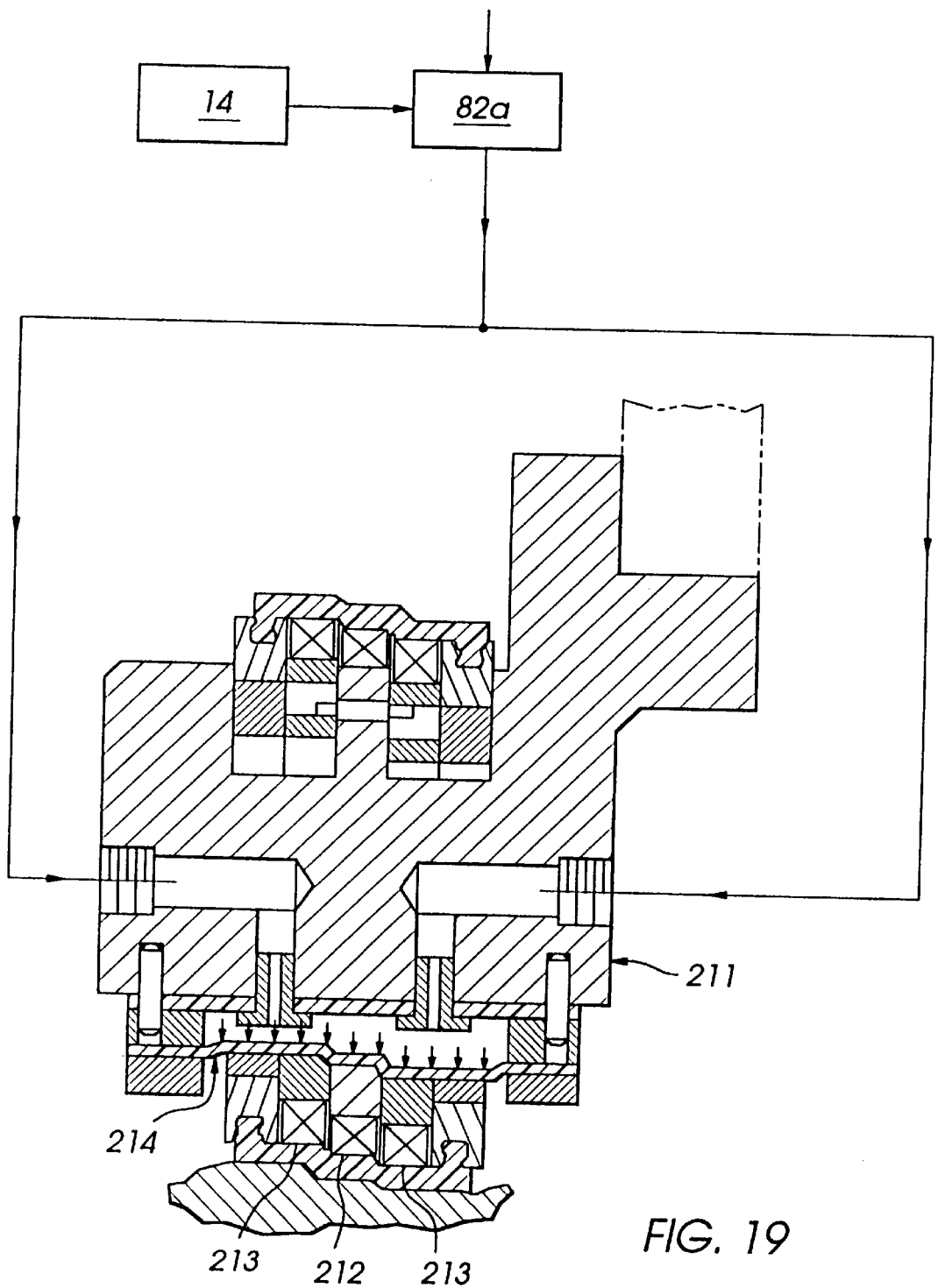
FIG. 19 is an elevational section through a segmented compactor for composite material.

The application of a variable force compactor to a variety of composite materials and machines is further facilitated by a reference to U.S. Pat. No. 4,869,774, of J. Wisbey, issued Sep. 26, 1989, which discloses a segmented compactor 211 which finds application in both tape laying and fiber placement machines. The entire disclosure and teaching of the '774 patent is expressly incorporated herein by reference. FIG. 19 depicts a segmented compactor 211 from the '774 patent, which has a reference roller 212 at its center position flanked by adjacent sliding rollers 213 which may move relative to the fixed reference roller 212. In this case, the actuator 214 for pressurizing the movable rollers 213 is also supplied with air from the valve unit 82a, and regulated by a numerical control program within the NC unit 14.

While the invention has been shown in connection with a preferred embodiment, it is not intended that the invention be so limited. Rather the invention extends to all such designs and modifications as come within the scope of the appended claims.

What is claimed is:

1. A method for compacting composite tape, comprising the following steps:

placing the composite tape on a support surface;

positioning a compaction assembly proximal said support surface;

providing a first compaction element on said assembly between said assembly and said tape;

providing a second compaction element on said assembly between said assembly and said tape;

providing a fluid driven actuator on said assembly for commonly actuating said first and second compaction elements;

directing pressurized fluid to said actuator to actuate said first and second compaction elements and apply compaction force to said tape;

sequentially actuating said first and second compaction elements;

applying a first compaction force to said tape with said first compaction element in response to actuation of said element;

applying a second compaction force to said tape with said second compaction element in response to actuation of said element; and transferring between said first and said second compaction elements while maintaining compaction force on said tape on said support surface.

2. A method for compacting composite material comprising the steps of:

positioning a compaction assembly, comprising a first compaction element, a second compaction element and a fluid actuator, commonly actuating said first and said second compaction elements, proximal a support surface;

placing the composite material between said support surface and the first and second compaction elements;

selectively activating said first compaction element for placing said composite material on said support surface;

placing the composite material on the support surface;

directing pressurized fluid to the actuator;

selectively applying a compaction force to the composite material by said actuator acting on the first compaction element;

selectively activating the second compaction element;

selectively applying a compaction force to the composite material by said actuator acting on the second compaction element.

3. The method according to claim 2 further comprising the step of varying the pressure of the pressurized fluid directed to the fluid actuator.

4. The method according to claim 3 wherein the composite material is a composite tape.

5. The method according to claim 2 further comprising the step of selectively varying the pressure of the pressurized fluid directed to the fluid actuator.

6. The method according to claim 5 wherein the composite material is a composite tape.

7. The method of claim 2 further comprising the step of varying the compaction force applied to the composite material by the actuator acting on the first and second compaction elements.

8. The method of claim 2 further comprising the step of varying the compaction force applied to the composite material by the actuator acting on the second compaction element.

9. The method according to claim 2 wherein the composite material is a composite tape.

* * * * *